United States Patent
Krause

(10) Patent No.: US 10,465,766 B2
(45) Date of Patent: Nov. 5, 2019

(54) TORQUE TRANSMISSION DEVICE

(71) Applicant: Schaeffler Technologies AG & Co. KG, Herzogenaurach (DE)

(72) Inventor: Thorsten Krause, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 13 days.

(21) Appl. No.: 15/871,543

(22) Filed: Jan. 15, 2018

(65) Prior Publication Data
US 2018/0202511 A1   Jul. 19, 2018

(30) Foreign Application Priority Data
Jan. 16, 2017   (DE) .................. 10 2017 100 664

(51) Int. Cl.
| | | |
|---|---|---|
| F16D 47/04 | (2006.01) | |
| F16F 15/04 | (2006.01) | |
| F16F 15/14 | (2006.01) | |
| F16H 57/08 | (2006.01) | |
| F16F 15/12 | (2006.01) | |

(52) U.S. Cl.
CPC .............. *F16F 15/04* (2013.01); *F16D 47/04* (2013.01); *F16F 15/12* (2013.01); *F16F 15/1478* (2013.01); *F16H 57/08* (2013.01); *F16F 2232/02* (2013.01)

(58) Field of Classification Search
CPC ............. F16H 45/02; F16H 2045/0268; F16H 2045/0221; F16H 2045/021; F16H 41/00–41/32; F16H 57/0006; F16H 2045/0205; F16F 15/14; F16F 15/12; F16F 15/18; F16F 15/1478; F16F 2232/02; F16F 15/13157
See application file for complete search history.

(56) References Cited

U.S. PATENT DOCUMENTS

| | | | | |
|---|---|---|---|---|
| 6,159,123 A | * | 12/2000 | Gumpoltsberger | .... B60K 17/02 188/140 A |
| 8,608,604 B1 | * | 12/2013 | Jawalkar Nagaraj | ... F16H 47/08 475/47 |
| 8,939,860 B2 | | 1/2015 | Dogel et al. | |
| 9,500,259 B1 | * | 11/2016 | Bai | ....... F16F 15/1206 |
| 2013/0020166 A1 | * | 1/2013 | Robinette | ............... F16H 47/08 192/3.21 |
| 2014/0047949 A1 | * | 2/2014 | Lorenz | ............. F16F 15/13157 74/664 |
| 2015/0065294 A1 | * | 3/2015 | Borntrager | ............... B60K 6/48 477/4 |
| 2015/0072822 A1 | * | 3/2015 | Swank | ..................... F16H 45/02 475/59 |
| 2016/0258519 A1 | * | 9/2016 | Horita | ................. F16F 15/1457 |
| 2017/0159784 A1 | * | 6/2017 | Basin | ...................... F16H 45/02 |

* cited by examiner

*Primary Examiner* — Jacob S. Scott
*Assistant Examiner* — Lillian T Nguyen
(74) *Attorney, Agent, or Firm* — LeKeisha M. Suggs

(57) ABSTRACT

A torque transmission device is disclosed that comprises a torque converter and a vibration damping device arranged outside the torque converter housing. The torque converter includes an impeller, a turbine wheel, and a stator. The torque transmission device further includes a power split device disposed inside the torque converter housing and connected to a lock-up clutch and the turbine wheel.

12 Claims, 1 Drawing Sheet

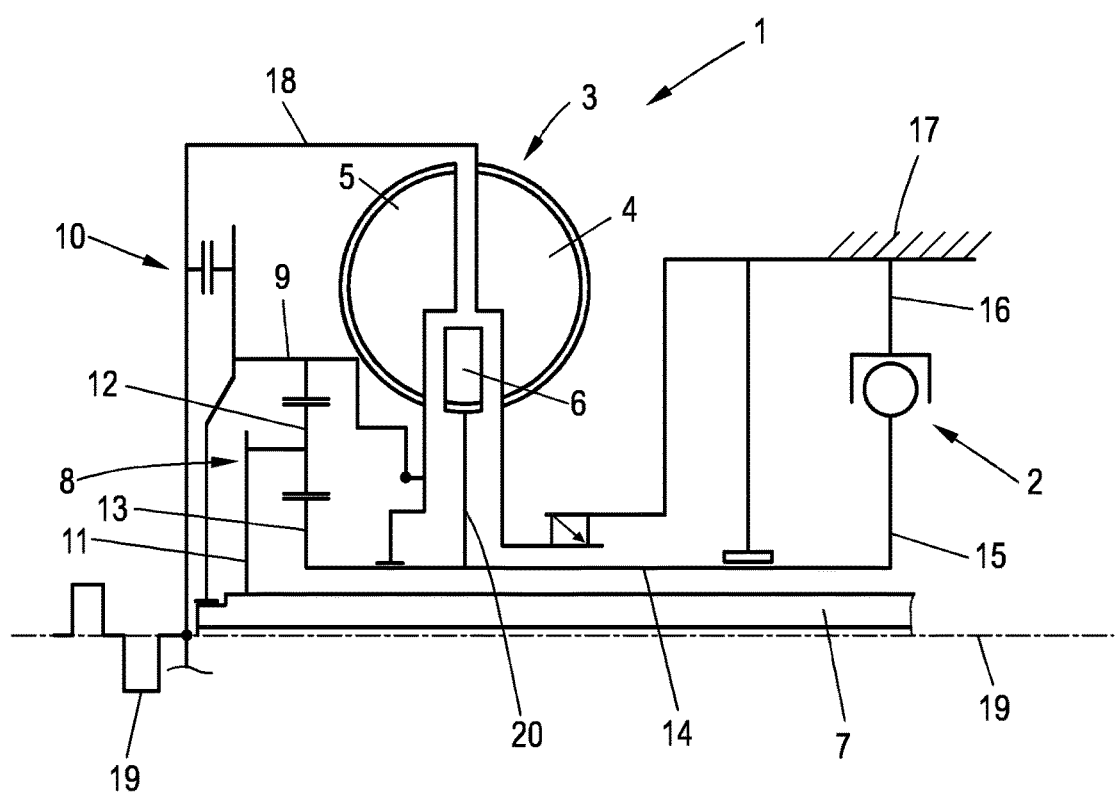

TORQUE TRANSMISSION DEVICE

CROSS-REFERENCE TO RELATED APPLICATIONS

This application claims priority to DE Patent Application No. 102017100664.8, filed Jan. 16, 2017, the disclosure of which is incorporated in its entirety by reference herein.

TECHNICAL FIELD

The present disclosure relates to a torque transmission device, comprising a vibration damping device, a torque converter arranged at least in sections within a housing of the torque transmission device and has an impeller, a turbine wheel and a stator, a transmission input shaft and a power split device arranged between the torque converter and the transmission input shaft.

BACKGROUND

Torque transmission devices are known from the prior art, in which, for example, a torsional damper is used in combination with a power split means. For example, U.S. Pat. No. 8,939,860 B2 discloses a torque transmission device that has a combination of this type of torsional damper and power split means. Here, a vibration damping device is arranged within the housing of the torque converter, power which is introduced, for example, via the lock-up clutch being split by means of a planetary gear mechanism. As a result of the arrangement of the vibration damping device within the torque converter or the housing of the torque converter, the vibration damping device is subject to the boundary conditions that prevail within the housing of the torque converter. The vibration damping device therefore experiences an absolute rotational speed and is subject to the influences of the centrifugal force. Furthermore, the vibration damping device is operated within the same medium that prevails within the housing of the torque converter.

SUMMARY

Embodiments of the present disclosure provide a torque transmission device that makes operation of the vibration damping device possible independently of the boundary conditions of the torque converter.

Embodiments disclose that the vibration damping device is arranged outside the housing of the torque transmission device, and the power split device is arranged within the housing of the torque transmission device.

The disclosure is based on the finding that the consequence of arranging the vibration damping device within the housing of the torque transmission device or the housing of the torque converter is that the vibration damping device experiences the absolute rotational speed, and the negative influences, such as friction hysteresis, influences on the long-term durability and the characteristic configuration, therefore have to be accepted in the design of the vibration damping device. In contrast, the present disclosure discloses that the vibration damping device is arranged outside the housing of the torque transmission device or the torque converter. As a result, the vibration damping device which is configured, for example, as a torsional damper can be operated independently of the boundary conditions of the remaining torque transmission device or the torque converter.

Embodiments disclose operation of the vibration damping device in a targeted manner, for example in an encapsulated manner, with a different lubricant than the fluid within the torque converter.

Embodiments disclose that the vibration damping device is arranged on the transmission side. Accordingly, in the torque transmission device according to the present disclosure, the vibration damping device is arranged on the transmission side and not in the housing of the torque converter, as is customary in the prior art. It is possible by way of the arrangement on the transmission side to support the vibration damping device independently of the housing of the torque converter or the torque transmission device, with the result that the vibration damping device can be operated in a manner that is decoupled from the above-described boundary conditions.

Embodiments disclose that the vibration damping device is supported on a transmission housing directly or by means of an actuator. According to the present disclosure, the vibration damping device is supported with respect to the transmission housing, with the result that the vibration damping device does not rotate with the torque converter, but rather one side of the vibration damping device is ultimately stationary together with the transmission housing. Furthermore, it can be provided here that, as an alternative to the direct support of the vibration damping device on the transmission housing, an "active" support of the vibration damping device on the transmission housing is configured. To this end, an actuator can preferably be used, with the result that the vibration damping device can be supported indirectly on the transmission housing and can be influenced via the actuator.

Embodiments disclose that a spring rate or a characteristic of the vibration damping device can be changed by means of the actuator. Accordingly, the actuator can be actuated in a targeted manner in such a way, or the vibration damping device can be switched via the actuator in such a way, that the spring rate or the characteristic of the vibration damping device can be changed. Therefore, the spring rate or the characteristic of the vibration damping device can be set in a manner which is dependent on the current operating point of the torque transmission device. It is advantageously therefore possible to change the vibration damping device in every operating state of the torque transmission device in such a way that damping which is as efficient as possible of vibrations which occur can take place.

Embodiments provide that the spring rate or the characteristic of the vibration damping device can be set by means of the actuator in such a way that vibrations of the one power branch of the power split device interfere with vibrations of the other power branch in a destructive manner.

Here, the power split device splits an incoming power or an incoming torque to two power branches, one of the two power branches being damped by means of the vibration damping device. The vibrations which are split to the two power branches are subsequently superimposed at the point, at which the power branches are combined again. As described above, the characteristic or the spring rate of the vibration damping device can be changed by means of the actuator in a manner which is dependent on the operating state, with the result that the vibrations of the damped power branch can interfere with the vibrations in the non-damped power branch in a destructive manner. The anti-resonance which is produced as a result brings about particularly effective damping or absorbing of the vibrations which occur, with the result that as little as possible of the vibrations which originally occur is introduced into the transmission input shaft.

Furthermore, the torque transmission device according to the present disclosure can be developed in such a way that the power split device is configured as a planetary gear mechanism or has a mechanism of this type. It is accordingly possible to conduct one power branch of the power split device through an internal gear of the planetary gear mechanism and the other power branch through a sun gear of the planetary gear mechanism, with the result that said power branches can be combined again by means of the planetary gear mechanism, in particular by way of the two inputs to the planets. As described above, one of the two power branches is coupled to the vibration damping device, with the result that the one power branch can be damped and the other power branch can be non-damped.

Furthermore, it can be provided according to the present disclosure that a stator stub of the torque converter is connected to a sun gear of the planetary gear mechanism, or that the stator stub of the torque converter is connected to the sun gear of the planetary gear mechanism and the vibration damping device. Here, one of the two power branches runs through the sun gear, and the other power branch runs through the impeller and/or the lock-up clutch via the internal gear into the planetary gear mechanism. Accordingly, the power which is supported on the stator or the torque which is introduced into the latter is transferred to the sun gear and is introduced into the planetary gear mechanism. It is preferably provided here that the sun gear of the planetary gear mechanism, which sun gear is connected to the stator stub, is at the same time connected to the vibration damping device, with the result that the power branch which is conducted via the stator is the damped power branch. Vibrations which are introduced into the stator can therefore be transmitted to the vibration damping device and can be damped by the latter.

To this end, the sun gear and the stator stub or the stator are arranged on a common stator shaft. According to this embodiment, the stator is not connected fixedly to the housing of the torque converter, but rather can be rotated relative to the housing. As a result, a relative movement is possible between the stator and the housing of the torque converter, with the result that vibrations in the torque transmission device which are transmitted to the stator can be conducted via the common stator shaft and can be damped by means of the vibration damping device. Here, the stator shaft does not rotate absolutely at the rotational speed of the torque converter, but rather experiences merely a "vibration force" which it transmits to the vibration damping device or from the latter to the sun gear in a damped manner.

It can preferably be provided here that the sun gear and/or the vibration damping device are/is connected directly to the stator stub or to a stator freewheel inner ring. Here, the stator has a freewheel inner ring, by means of which the free rotatability is ensured if the lock-up clutch is closed. That is to say, above a certain rotational speed, as soon as the lock-up clutch is closed, it is ensured that the stator can rotate freely with the turbine wheel.

Furthermore, the torque transmission device according to the present disclosure can be developed in such a way that the transmission input shaft is connected to a planetary carrier of the planetary gear mechanism. The two power branches which are introduced (as described above) firstly via the stator stub into the sun gear and secondly via the turbine wheel into the internal gear are combined by way of the planetary gear mechanism, with the result that the two superimposed torques of the two power branches are transmitted by way of the planetary carrier to the transmission input shaft. Here, as has likewise been described above, a superimposition of the vibrations of the power branches takes place, with the result that, in a preferred case of anti-resonance, there is a destructive interference between the vibrations of the two power branches, and a virtually complete eradication of the vibrations can therefore be brought about. This achieves a situation where the vibrations which are forwarded via the planetary carrier into the transmission input shaft can be eliminated virtually completely.

Furthermore, it can be provided in the torque transmission device according to the present disclosure that the internal gear of the planetary gear mechanism is connected to an output of a lock-up clutch and the turbine wheel, the input of the lock-up clutch being connected to the drive. Accordingly, the power split takes place via the lock-up clutch into the internal gear or via the turbine wheel into the internal gear in a manner which is dependent on the open or closed state of the lock-up clutch, the second power branch being conducted via the stator or via the stator stub into the sun gear, as described above.

BRIEF DESCRIPTION OF THE DRAWINGS

FIG. 1 shows a torque transmission device according to the present disclosure.

DETAILED DESCRIPTION

The single FIGURE shows a torque transmission device 1, comprising a vibration damping device 2 and a torque converter 3 with an impeller 4, a turbine wheel 5 and a stator 6. Furthermore, the torque transmission device 1 is assigned a transmission input shaft 7 and a power split device 8.

The power split device 8 comprises an internal gear 9 which is coupled or connected to a lock-up clutch 10 and the turbine wheel 5. Furthermore, the power split device 8 has a plurality of planets 12 which are supported by a planetary carrier 11 and mesh firstly with the internal gear 9 and secondly with a sun gear 13. The planetary carrier 11 is connected to the transmission input shaft 7. The sun gear 13 is arranged at one end of a stator shaft 14, the stator shaft 14 being coupled at its end which lies opposite the sun gear 13 to the vibration damping device 2. The vibration damping device 2 is configured, for example, as a torsional damper. It can be seen that the vibration damping device 2 is connected by way of one side 15 to the stator shaft 14 and by way of the other side 16 to a transmission housing 17. The vibration damping device 2 is accordingly arranged outside a housing 18 of the torque converter 3.

A torque which is introduced via a drive 19 into the torque transmission device 1 is transmitted via the impeller 4 to the turbine wheel 5. By way of the power split, the torque in the first power branch is transmitted to the internal gear 9 via the turbine wheel 5 which is coupled to the internal gear 9, and the torque in the other power branch is transmitted to the stator shaft 14 via the stator 6, via a stator stub 20. The two power branches are accordingly combined in the power split device 8 which, as can be seen, is configured as a planetary gear mechanism, since the planets 12 mesh both with the internal gear 9 and with the sun gear 13. If the lock-up clutch 10 is closed, the torque which is introduced by the drive 19 is introduced via the lock-up clutch 10 into the internal gear 9.

As a consequence, this results in two power branches, the one power branch which leads via the stator 6 or the stator stub 20 being damped by means of the vibration damping device 2. The two power branches are combined in the power split device 8, with the result that the vibrations which occur in the individual power branches are superimposed. Accordingly, a suitable selection or design of the vibration damping device 2 can achieve a situation, in particular, where the vibrations which occur in the one power branch can be superimposed in a destructive manner with the vibrations which occur in the other power branch. To this end, the vibration damping device 2 can be changed, in particular, by means of an actuator (not shown) in such a way that the spring rate or the characteristic can be set, with the result that the vibrations which occur in the damped power branch vibrate with anti-resonance with respect to the vibrations of the non-damped power branch and can therefore be superimposed in a destructive manner with the latter. As a result, the vibrations which are ultimately introduced into the transmission input shaft 7 can be virtually equalized on account of the anti-resonance.

LIST OF REFERENCE NUMBERS

1 Torque transmission device
2 Vibration damping device
3 Torque converter
4 Impeller
5 Turbine wheel
6 Stator
7 Transmission input shaft
8 Power split device
9 Internal gear
10 Lock-up clutch
11 Planetary carrier
12 Planets
13 Sun gear
14 Stator shaft
15 Side
16 Side
17 Transmission housing
18 Housing
19 Drive
20 Stator stub

What is claimed is:

1. A torque transmission device, comprising:
a torque converter including a housing and an impeller, a turbine wheel, and a stator disposed within the housing of the torque converter;
a power split device disposed within the housing of the torque converter and connected to a lock-up clutch and the turbine wheel, wherein the power split device is configured as a planetary gear mechanism; and
a vibration damping device arranged outside the housing of the torque converter, wherein a stator stub of the torque converter is connected to a sun gear of the planetary gear mechanism and the vibration damping device.

2. The torque transmission device of claim 1, wherein the vibration damping device is arranged on a transmission side of the torque transmission device.

3. The torque transmission device of claim 1, wherein the vibration damping device is supported on a transmission housing.

4. The torque transmission device of claim 3, wherein the vibration damping device is configured to have a spring rate that can be changed.

5. The torque transmission device of claim 4, wherein the spring rate of the vibration damping device is configured to be set in such a way that vibrations of a first power branch of the power split device interfere with vibrations of a second power branch in a destructive manner.

6. The torque transmission device of claim 1, wherein the sun gear or the vibration damping device is connected directly to the stator stub or to a stator freewheel inner ring.

7. The torque transmission device of claim 1, wherein a planetary carrier of the planetary gear mechanism is connected to a transmission input shaft.

8. The torque transmission device of claim 1, wherein an internal gear of the planetary gear mechanism is connected to an output of the lock-up clutch.

9. The torque transmission device of claim 8, wherein the turbine wheel and an input of the lock-up clutch is connected to a drive.

10. A torque transmission device, comprising:
a torque converter including a housing and an impeller, a turbine wheel, and a stator disposed within the housing of the torque converter;
a power split device disposed within the housing of the torque converter and connected to a lock-up clutch and the turbine wheel, wherein the power split device is configured to split a torque into a first power branch and second power branch; and
a vibration damping device arranged outside the housing of the torque converter, the vibration damping device being coupled to the first power branch and configured to dampen vibrations in the first power branch, wherein a spring rate of the vibration damping device is changed such that a superimposition of vibrations damped in the first power branch with vibrations in the second power branch results in an elimination of vibrations forwarded into a transmission input shaft.

11. The torque transmission device of claim 10, wherein the power split device is configured as a planetary gear mechanism, the first power branch is arranged to run through the stator and a sun gear of the planetary gear mechanism, and the second power branch is arranged to run through the impeller or lock-up clutch via an internal gear of the planetary gear mechanism.

12. The torque transmission device of claim 10, wherein the vibration damping device is supported on and connected to a transmission housing.

* * * * *